No. 858,362. PATENTED JULY 2, 1907.
A. M. ANDERSON & C. QUESNELL.
CYLINDER TOOTH FOR USE IN THRESHING MACHINERY.
APPLICATION FILED NOV. 20, 1905.
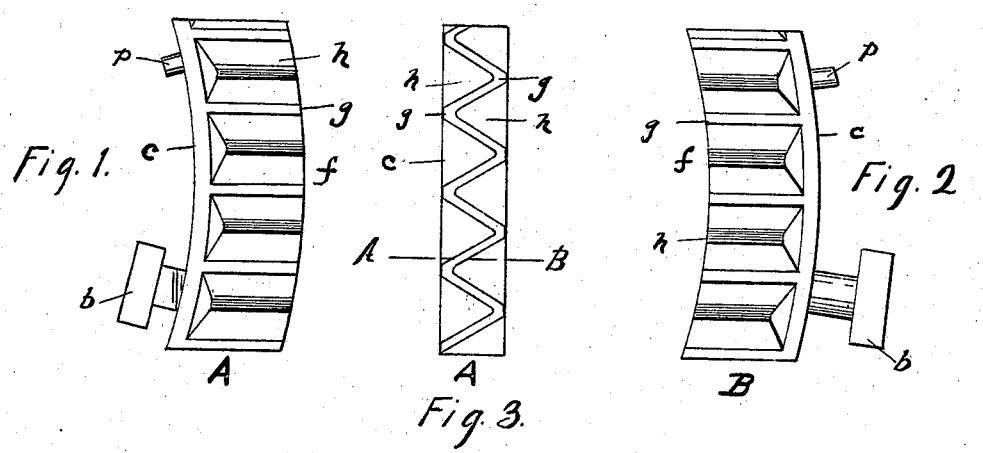
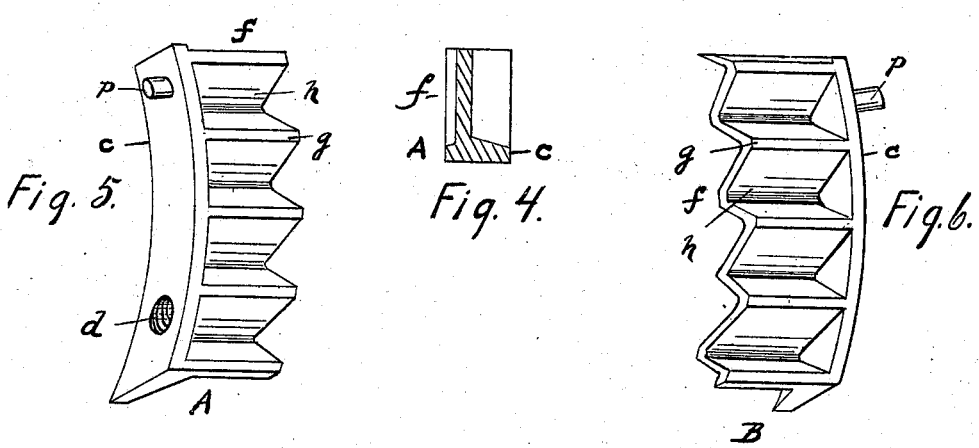
Witnesses:
John J. Anthony
Geo F Albright
Inventors.
Andrew M. Anderson
Cornelius Quesnell

UNITED STATES PATENT OFFICE.

ANDREW M. ANDERSON AND CORNELIUS QUESNELL, OF MOSCOW, IDAHO.

CYLINDER-TOOTH FOR USE IN THRESHING MACHINERY.

No. 858,362.  Specification of Letters Patent.  Patented July 2, 1907.

Application filed November 20, 1905. Serial No. 288,303.

*To all whom it may concern:*

Be it known that we, ANDREW M. ANDERSON and CORNELIUS QUESNELL, both citizens of the United States, and residing at Moscow, in the county of Latah and State of Idaho, have invented a new and valuable Improvement in Cylinder-Teeth for Use in Threshing Machinery, a full and accurate description of which is given in the following specification, together with the accompanying drawings, which are to constitute a part of said specification and in which similar characters of reference indicate corresponding parts in all the drawings.

Our invention relates to threshing machines and more particularly to teeth for use upon the cylinders and concaves thereof and the object of the invention is to provide teeth which are formed in series, said teeth being so shaped as to quickly and thoroughly thresh material supplied thereto even though the mechanism be operated at a lower speed than customary.

The invention consists of teeth formed in series each series consisting of a base which is shaped to conform to the contour of the surface to which the teeth are to be fastened and upon this base is formed an outstanding rib which is transversely crimped or corrugated so that the outer or working edge presents a zigzag appearance.

The invention consists also in providing a base adapted to stiffen or reinforce the corrugated rib.

The invention also consists of certain other novel features of construction and combinations of parts which will be hereinafter more fully described and pointed out in the claims.

In the accompanying drawings is shown the preferred form of the invention.

In said drawings: Figure 1 is a side view of one of the teeth, for use on a cylinder; Fig. 2 is a similar view showing the opposite side of the tooth for use on a concave; Fig. 3 is a plan view of the teeth shown in Figs. 1 and 2; Fig. 4 is a section on line A—B Fig. 3; Fig. 5 is a perspective view of the tooth shown in Fig. 1 with the securing bolt detached; and Fig. 6 is a similar view of the tooth shown in Fig. 2.

Referring to the figures by characters of reference, A is a tooth for use upon the cylinder of a threshing machine and B is a tooth for use upon the concave of a threshing machine. Both teeth are similar with the exception that the curvature of the bases $c$ thereof are different so as to conform with the contour of the structure to which the teeth are to be fastened. Arranged longitudinally upon the base $c$ is an outstanding rib $f$ which is crimped or corrugated transversely to form angular recesses $h$ at opposite sides thereof and laterally extending teeth $g$, said teeth being disposed in alinement with the opposite edges of the base $c$. A lug $p$ extends from the base $c$ adjacent one end and a threaded opening $d$ is formed within the base adjacent its other end to receive a securing bolt $b$. As shown particularly in Figs. 1, 2 and 4 the thickness of the base $c$ is gradually increased toward the innermost portion of each recess $h$ and therefore the teeth are reinforced at the points of conjunction of the base $c$ and rib $f$. Attention is also called to the fact that the laterally extending teeth $g$ are formed with angular faces thereby insuring more efficient results than where a smooth rounded surface is utilized.

It is thought that the manner of using these teeth will be fully understood by those versed in this art. The bases $c$ are shaped to conform to the contour of the cylinder or concave to which the teeth are to be fastened and the lugs utilized are placed in engagement with the cylinder or concave and the teeth are then fastened by means of the bolts $b$. The contour of the outer or working edge of the rib $f$ is similar to that of the base $c$ thereof as clearly shown in Figs. 1 and 2.

The preferred form of the invention has been set forth in the foregoing description but we do not limit ourselves thereto as we are aware that modifications may be made therein without departing from the spirit or sacrificing the advantages thereof, and we therefore reserve the right to make such changes as fairly fall within the scope of the claims.

What is claimed is:

A tooth for threshing machines comprising a base and an outstanding rib thereon and integral therewith, said rib extending longitudinally of the base and corrugated along lines outstanding from the base, said rib being of uniform height, said corrugations forming alternately arranged angular teeth and recesses along each side portion of the base, the apexes of the oppositely disposed teeth being parallel and flush with the sides of the base, said base being of gradually increasing thickness from its sides toward the apex of each recess.

ANDREW M. ANDERSON.
CORNELIUS QUESNELL.

Witnesses:
JOHN J. ANTHONY,
GEO. F. ALBRIGHT.